United States Defensive Publication [19] (H) [11] T975,002

Linda [43] Oct. 3, 1978

[54] METHOD FOR CONTROLLING BIOFOULING IN DRIP IRRIGATION SYSTEM EMITTER ORIFICES

[75] Inventor: Frederick William Linda, Florence, N.J.

[73] Assignee: FMC Corporation, Philadelphia, Pa.

[21] Appl. No.: 819,532

[22] Filed: Jul. 27, 1977

[51] Int. Cl.[2] ..... C02B 3/06

[52] U.S. Cl. ..... 210/62

[57] ABSTRACT

An improved method for controlling biofouling in drip irrigation system emitter orifices wherein a chlorinated derivative of cyanuric acid, such as trichloroisocyanuric acid, dichloroisocyanuric acid, sodium dichloroisocyanurate, and its hydrates or mixtures thereof, is employed as the chlorinating source. The chlorinated derivative of cyanuric acid is metered into the irrigation water at a point near the main irrigation water supply pump in an amount sufficient to meet the chlorine demand of the irrigation water and to provide a residual chlorine content of about 0.5 ppm available chlorine in the irrigation water at the drip emitter most distant from the chlorination point.

8 Claims, No Sheets Drawing,

18 Pages Specification

The file of this unexamined application may be inspected and copies thereof may be purchased (849 O.G. 1221, Apr. 9, 1968).